United States Patent
Thongrattana et al.

(10) Patent No.: US 9,180,563 B2
(45) Date of Patent: Nov. 10, 2015

(54) DE-SWAGE MACHINE FOR REMOVAL OF A HEAD FROM A HEAD STACK ASSEMBLY AND METHOD OF USING THE SAME

(71) Applicant: Western Digital Technologies, Inc., Irvine, CA (US)

(72) Inventors: Chaiya Thongrattana, Donmuang (TH); Ruksakul Boonpuang, Bangpa-In (TH); Wirat Khamon, Donmuang (TH); Jetsada Nontree, Ramkhamhaeng (TH); Piya Maneechote, Ayutthaya (TH); Chaiyan Khwanma, Maung (TH)

(73) Assignee: Western Digital Technologies, Inc., Irvine, CA (US)

(*) Notice: Subject to any disclaimer, the term of this patent is extended or adjusted under 35 U.S.C. 154(b) by 319 days.

(21) Appl. No.: 13/791,818

(22) Filed: Mar. 8, 2013

(65) Prior Publication Data

US 2014/0250656 A1  Sep. 11, 2014

(51) Int. Cl.
*G11B 5/48* (2006.01)
*B23P 19/04* (2006.01)
*G11B 5/127* (2006.01)
*G11B 5/31* (2006.01)
*G11B 5/50* (2006.01)

(52) U.S. Cl.
CPC .............. *B23P 19/04* (2013.01); *G11B 5/1272* (2013.01); *G11B 5/3166* (2013.01); *G11B 5/48* (2013.01); *G11B 5/4826* (2013.01); *G11B 5/50* (2013.01); *Y10T 29/49023* (2015.01); *Y10T 29/49036* (2015.01); *Y10T 29/49764* (2015.01); *Y10T 29/53165* (2015.01); *Y10T 29/53274* (2015.01)

(58) Field of Classification Search
CPC .... B23P 19/04; G11B 5/3166; G11B 5/1272; G11B 5/4826; G11B 5/48; G11B 5/50; Y10T 29/49023; Y10T 29/49036; Y10T 29/53165; Y10T 29/53274; Y10T 29/49764
See application file for complete search history.

(56) References Cited

U.S. PATENT DOCUMENTS

| | | | |
|---|---|---|---|
| 5,347,413 | A | 9/1994 | Hanke et al. |
| 5,471,735 | A | 12/1995 | Hanke et al. |
| 5,553,374 | A | 9/1996 | Hanks et al. |
| 6,049,973 | A | 4/2000 | Frank, Jr. et al. |
| 6,249,404 | B1 | 6/2001 | Doundakov et al. |
| 6,269,532 | B1 | 8/2001 | Toensing |
| 6,389,684 | B1 | 5/2002 | Toensing et al. |

(Continued)

OTHER PUBLICATIONS

Notification of Transmittal of the International Search Report and Written Opinion dated Jun. 5, 2014 for related PCT Application No. PCT/US2014/022126, pp. 1-10.

*Primary Examiner* — Sarang Afzali
*Assistant Examiner* — Ruth G Hidalgo-Hernande

(57) ABSTRACT

A de-swage machine for removal of a head of a head stack assembly including a tooling unit configured to receive a head stack assembly comprising a plurality of heads and an indicia, a blade module configured to remove a head from the head stack assembly, an indicia reader configured to read the indicia, and a controller. The controller is configured to select and remove a head from the head stack assembly by at least reading the indicia using the indicia reader, transmitting the indicia to a database, receiving head stack assembly information corresponding to the indicia from the database, selecting the head for removal based on the head stack assembly information, and removing the selected head using the blade module. The blade module can also include a force sensor, and the de-swage machine can also include an imaging unit.

8 Claims, 16 Drawing Sheets

(56) References Cited

U.S. PATENT DOCUMENTS

| | | |
|---|---|---|
| 6,467,153 B2 | 10/2002 | Butts et al. |
| 6,651,192 B1 | 11/2003 | Viglione et al. |
| 6,657,801 B1 | 12/2003 | Chue et al. |
| 6,687,093 B1 | 2/2004 | Butler et al. |
| 6,704,995 B2 | 3/2004 | Toensing et al. |
| 6,751,041 B1 | 6/2004 | Codilian et al. |
| 6,772,506 B2 | 8/2004 | Toensing |
| 6,788,480 B1 | 9/2004 | Codilian et al. |
| 6,791,782 B1 | 9/2004 | Codilian et al. |
| 6,792,669 B2 | 9/2004 | Codilian |
| 6,798,592 B1 | 9/2004 | Codilian et al. |
| 6,859,995 B2 | 3/2005 | Kamigama et al. |
| 6,859,996 B1 * | 3/2005 | Slife et al. .................. 29/603.03 |
| 6,894,861 B1 | 5/2005 | Codilian et al. |
| 6,897,393 B1 | 5/2005 | Codilian et al. |
| 6,898,044 B1 | 5/2005 | Chheda |
| 6,943,972 B1 | 9/2005 | Chue et al. |
| 7,003,626 B1 | 2/2006 | Chheda et al. |
| 7,027,242 B1 | 4/2006 | Terrill et al. |
| 7,046,467 B1 | 5/2006 | Chheda |
| 7,058,759 B1 | 6/2006 | Reiser et al. |
| 7,072,129 B1 | 7/2006 | Cullen et al. |
| 7,076,391 B1 | 7/2006 | Pakzad et al. |
| 7,076,603 B1 | 7/2006 | Chheda |
| 7,136,242 B1 | 11/2006 | Chue et al. |
| 7,139,145 B1 | 11/2006 | Archibald et al. |
| 7,145,744 B1 | 12/2006 | Clawson et al. |
| 7,178,432 B1 | 2/2007 | Han et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1 | 2/2009 | Klassen et al. |
| 7,506,553 B1 | 3/2009 | Panyavoravaj |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,694,410 B2 | 4/2010 | Kamigama et al. |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 2001/0027602 A1 | 10/2001 | Toensing |
| 2003/0151876 A1 | 8/2003 | Kamigama et al. |
| 2005/0091835 A1 | 5/2005 | Kamigama et al. |
| 2006/0085970 A1 | 4/2006 | Hosaka et al. |
| 2008/0084630 A1 | 4/2008 | Trongjitwikrai et al. |
| 2009/0157848 A1 | 6/2009 | Khoo |
| 2010/0108256 A1 | 5/2010 | Roajanasiri et al. |
| 2013/0057986 A1 | 3/2013 | Vangal-Ramamurthy et al. |
| 2013/0248545 A1 | 9/2013 | Thongjitti et al. |

* cited by examiner

US 9,180,563 B2

DE-SWAGE MACHINE FOR REMOVAL OF A HEAD FROM A HEAD STACK ASSEMBLY AND METHOD OF USING THE SAME

BACKGROUND

During a manufacture of a disk drive, components of the disk drive may be damaged. For example, a head of a head stack assembly in the disk drive may become damaged. Rather than disposing of the whole disk drive or even the whole head stack assembly, the damaged head can be removed.

Conventionally, the removal of the damaged head involved a user loading the head stack assembly onto a conventional de-swage machine. The user then manually determines which head of the head stack assembly to remove and manually aligns the blades with the head of the head stack assembly for removal. The user manually moves the blade down towards the head stack assembly to separate a portion of the head stack assembly containing the head to be removed from the head stack assembly.

However, the head stack assembly often contains more than one head. Furthermore, such heads may be rather small in size due to the diminishing size of the disk drive. In such a case, the user may accidentally choose the wrong head for removal. In addition, even if the user selects the correct head for removal, the wrong head may be removed anyways due to the misalignment of the blade and the head that should be removed. This may create additional expenses for the repair of the head stack assembly.

Even if the blade is generally aligned with the head that should be removed, the blade may not be precisely aligned to cleanly separate the portion of the head stack assembly containing the head to be removed from the head stack assembly. In such a case, the portion of the head stack assembly containing the head to be removed or even the blade itself may be undesirably damaged.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
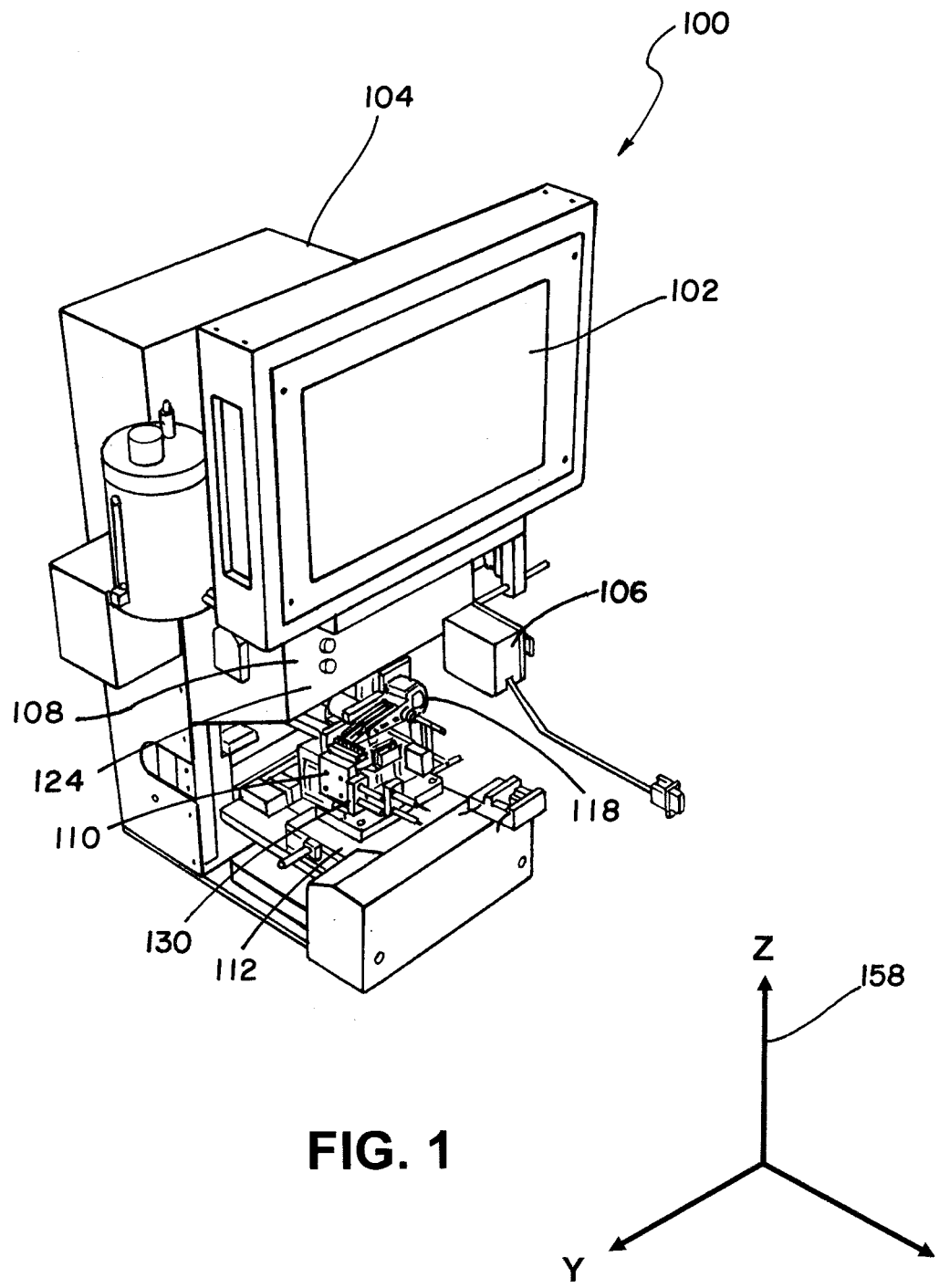
FIG. 1 depicts a de-swage machine according to an embodiment.

In an embodiment, as shown in FIG. 1, a de-swage machine 100 comprises a screen 102, a controller 104, an indicia reader 106, a blade module 108, and a tooling unit 110. In an embodiment, the screen 102 is configured to display information for operation of the de-swage machine 100. The screen 102 can be, for example, a touch screen. In an embodiment, the controller 104 is configured to operate the de-swage machine 100. In an embodiment, the indicia reader 106 is configured to read an indicia. The indicia can be, for example, a barcode, a two-dimensional bar code (e.g. QR code) or a serial number (e.g., part number, stock keeping unit, etc.). The indicia reader 106 can be, for example, a barcode scanner or image scanner. In an embodiment shown in FIG. 1, an axis guide 158 indicates an X-axis, a Y-axis, and a Z-axis for movement of one or more components of the de-swage machine 100.

Figure 2:
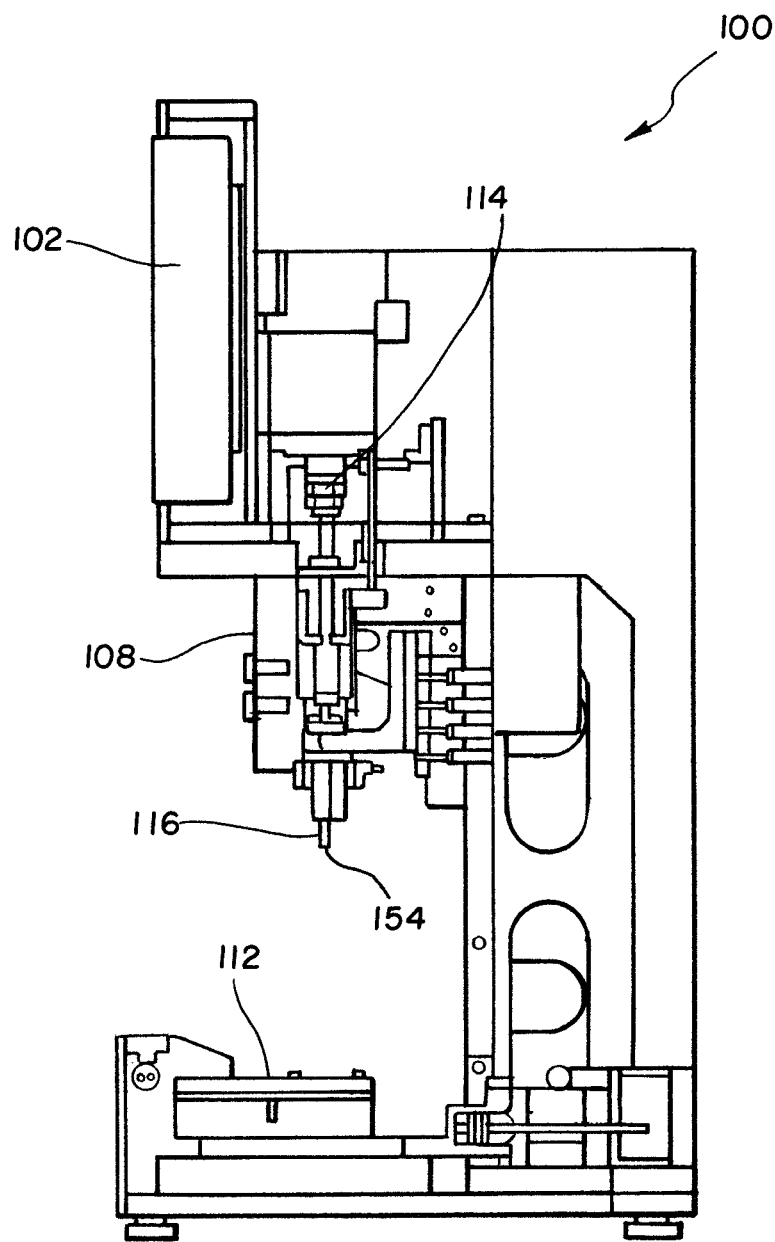
FIG. 2 depicts a partial side view of a de-swage machine according to an embodiment.

In an embodiment shown in FIG. 1, the blade module 108 comprises a cover 124. In an embodiment shown in FIG. 2, a side view of the de-swage machine 100 is shown with the tooling unit 110 and the cover 124 partially removed. As can be seen in the embodiment in FIG. 2, the blade module 108 further comprises an actuator motor 114 and a blade 116. In an embodiment, the blade 116 comprises a blade tip 154. In an embodiment, the actuator motor 114 moves the blade 116 to remove a head of a head stack assembly. For example, the actuator motor 114 can move the blade 116 along the Y-axis or the Z-axis to remove a head of a head stack assembly. Furthermore, in an embodiment, the actuator motor 114 can move the blade 116 along the X-axis instead of or in addition to the Y-axis. In an embodiment, the actuator motor 114 can move the blade 116 vertically upwards and downwards to remove a head of a head stack assembly. Furthermore, as seen in an embodiment in FIG. 3, which is a side view of the de-swage machine 100 with portions of the de-swage machine 100 removed, the blade module 108 further comprises a force sensor 120. In an embodiment, the force sensor 120 detects a force received by the blade 116.

Referring back to the embodiment shown in FIG. 1, the tooling unit 110 comprises a body 130 and an actuator motor 112. In an embodiment, the body 130 is configured to receive and hold a head stack assembly 118 for removal of a head of the head stack assembly 118 as shown in an embodiment in FIG. 1. In an embodiment, the actuator motor 112 moves the body 130 along an X-axis or a Y-axis for removal of a head of the head stack assembly 118 as shown in an embodiment in FIG. 1. In an embodiment shown in FIG. 4, an indicia 146 is placed on an indicia holder 144. Furthermore, the indicia holder 144 is placed on the body 130 of the tooling unit 110. In an embodiment, the indicia 146 is read by the indicia reader 106, as disclosed above, to uniquely identify a head stack assembly 118. Furthermore, in an embodiment, the indicia 146 comprises information regarding the selected head of the head stack assembly 118 for removal. Such information can indicate, for example, which head of the head stack assembly 118 should be removed.

Figure 4:
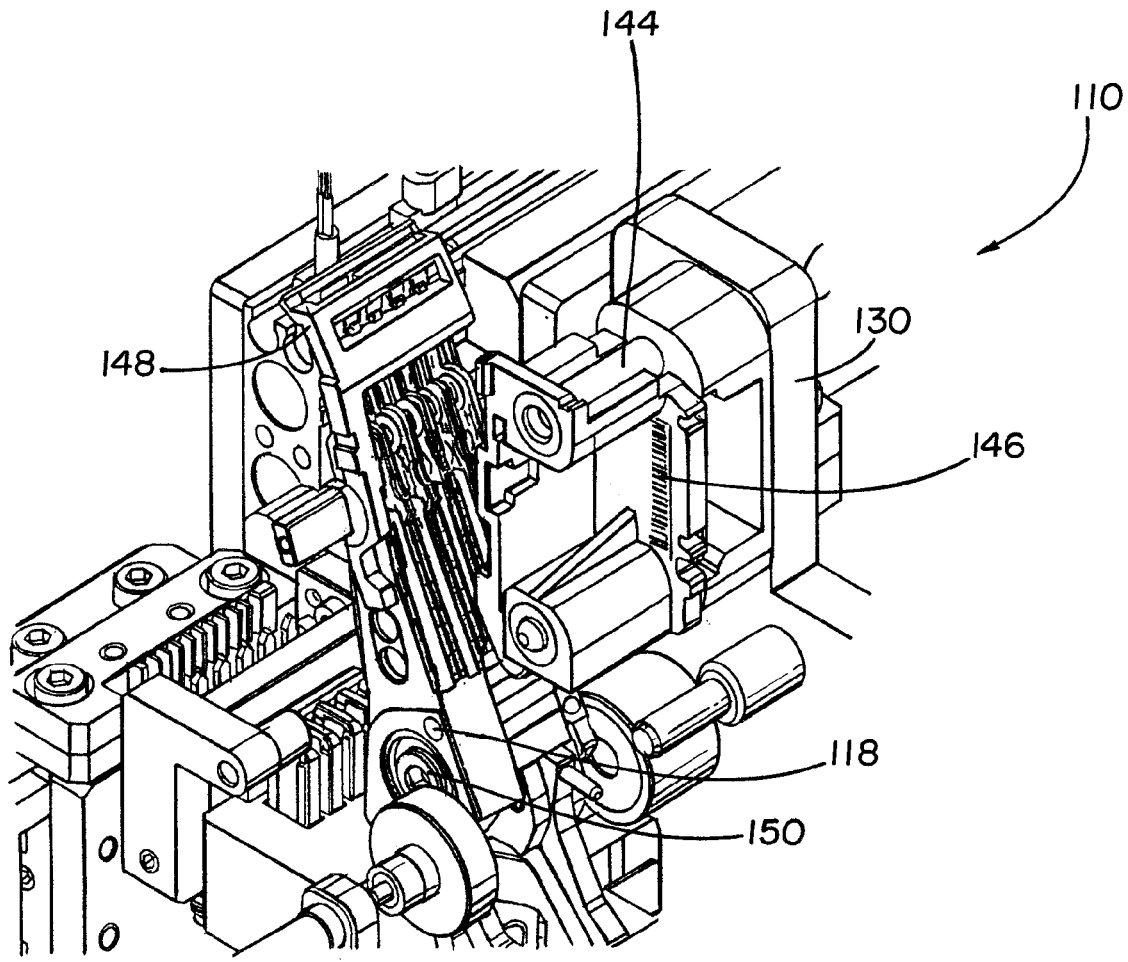
FIG. 4 depicts a perspective view of a tooling unit according to an embodiment.

In the embodiment shown in FIG. 4, the head stack assembly 118 is attached to a pivot 150 of the body 130 to secure the head stack assembly 118 to the body 130. Furthermore, in an embodiment the heads of the head stack assembly 118 are protected by a shipping comb 148. In the illustrated embodiment, the head stack assembly 118 is also in a substantially vertical direction. However, as shown in an embodiment in FIG. 5, the head stack assembly 118 is rotated about the pivot 150 to a substantially horizontal position. The head stack assembly 118 is prevented from over rotation by a stopper 132. After the head stack assembly 118 has been rotated to the desired position, a fan tail bias 122 may be used to secure the head stack assembly 118 to the body 130. Arms of the head stack assembly are supported by arm supports 126 of the body 130. Furthermore, the shipping comb 148 has been removed from the head stack assembly 118 to expose heads 136 of the head stack assembly 118. The heads 136 of the head stack assembly 118 are protected during the removal process by head protection units 128 of the body 130.

Figure 5:
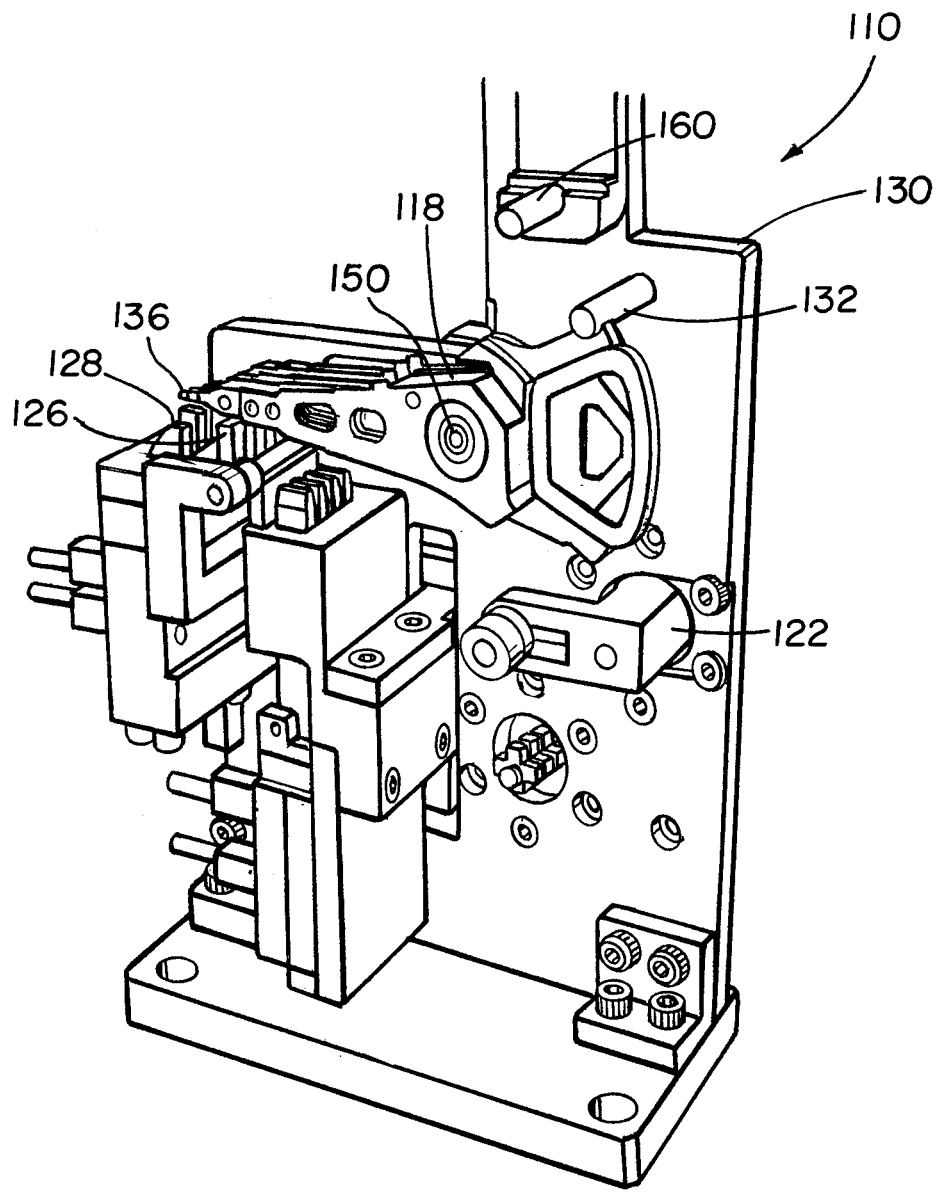
FIG. 5 depicts a perspective view of a tooling unit according to an embodiment.

In the embodiment shown in FIG. 5, the indicia holder 144 and the indicia 146 are not shown. However, as shown in the embodiment in FIG. 5, the indicia holder 144 would be placed on the flex holder 160 to secure the indicia holder 144 to the body 130.

Figure 6:
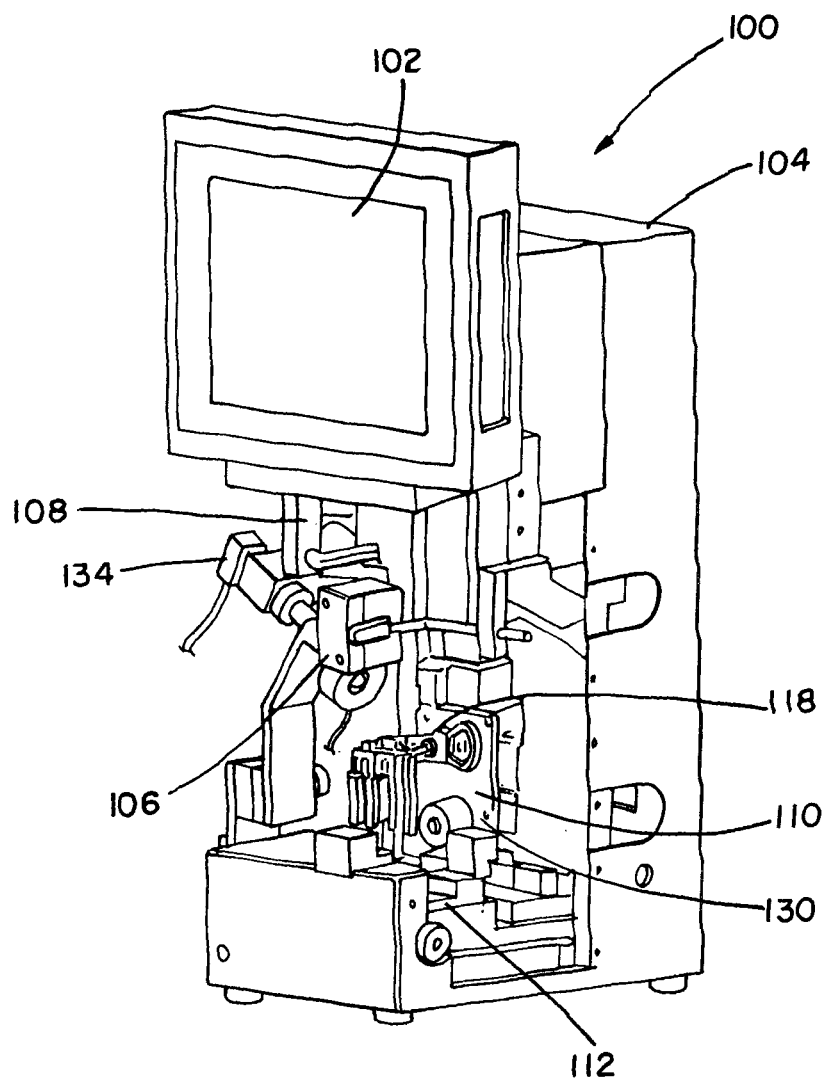
FIG. 6 depicts a perspective view of a de-swage machine including an imaging unit according to an embodiment.
Figure 7:
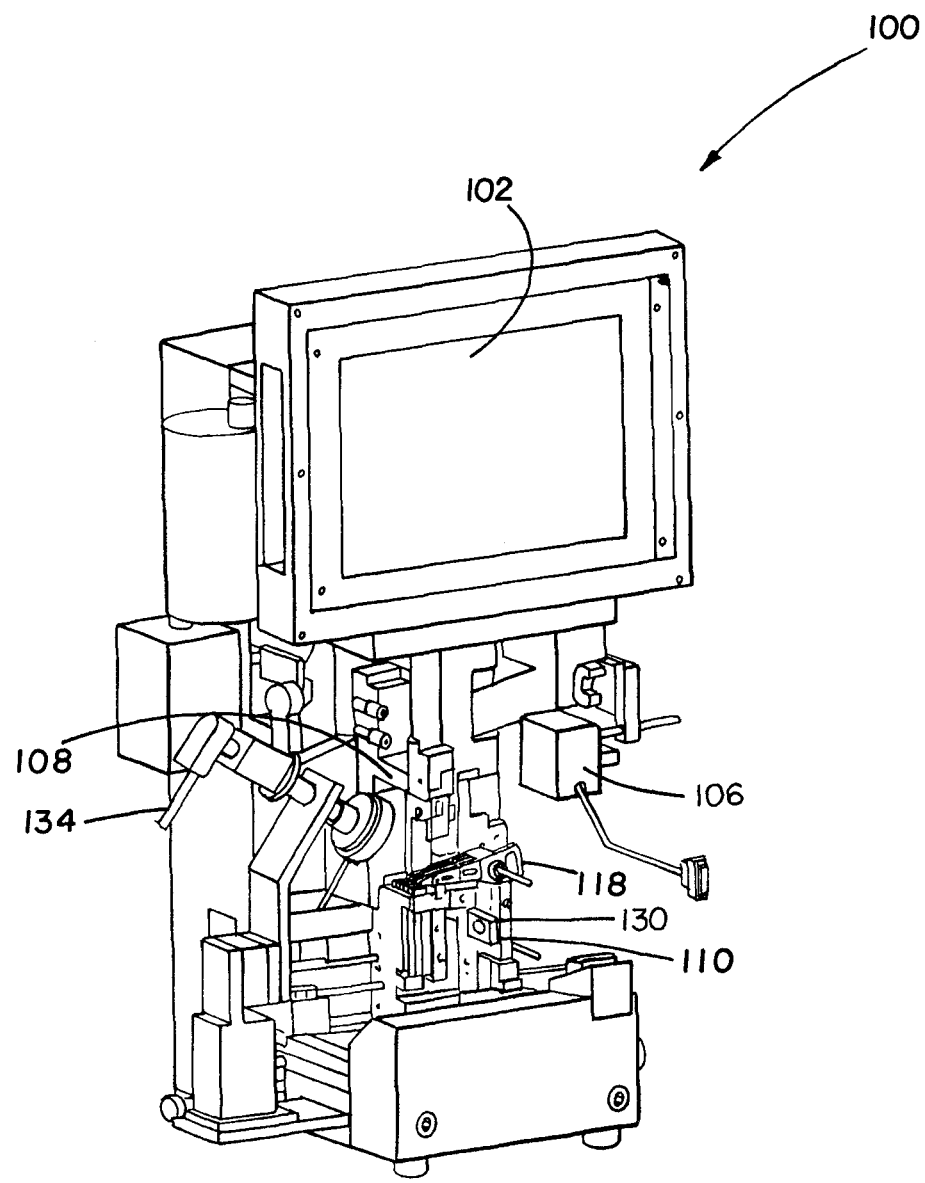
FIG. 7 depicts a perspective view of a de-swage machine including an imaging unit according to an embodiment.

In an embodiment, FIGS. 6 and 7 show additional features of the de-swage 100 from the FIG. 1. In an embodiment shown in FIGS. 6 and 7, only portions of the de-swage machine 100 are shown. In the embodiment shown in FIGS. 6 and 7, the de-swage machine 100 further comprises an imaging unit 134. In an embodiment, the imaging unit 134 comprises a camera. The imaging unit 134 can, for example, generate position information of the blade 116 and position information of the selected head for removal. The position information of the blade 116 and the position information of the selected head for removal can be used, for example, to perform auto gage verification and to remove the selected head, which will be described in more detail below.

In an embodiment, the position information of the blade 116 comprises Z-axis information. However, in an embodiment, the position information of the blade 116 can also comprise X-axis and/or Y-axis information. In an embodiment, the position information of the selected head for removal comprises X-axis and Y-axis information. However, in an embodiment, the position information of the selected head for removal can also comprise Z-axis information.

Figure 8:
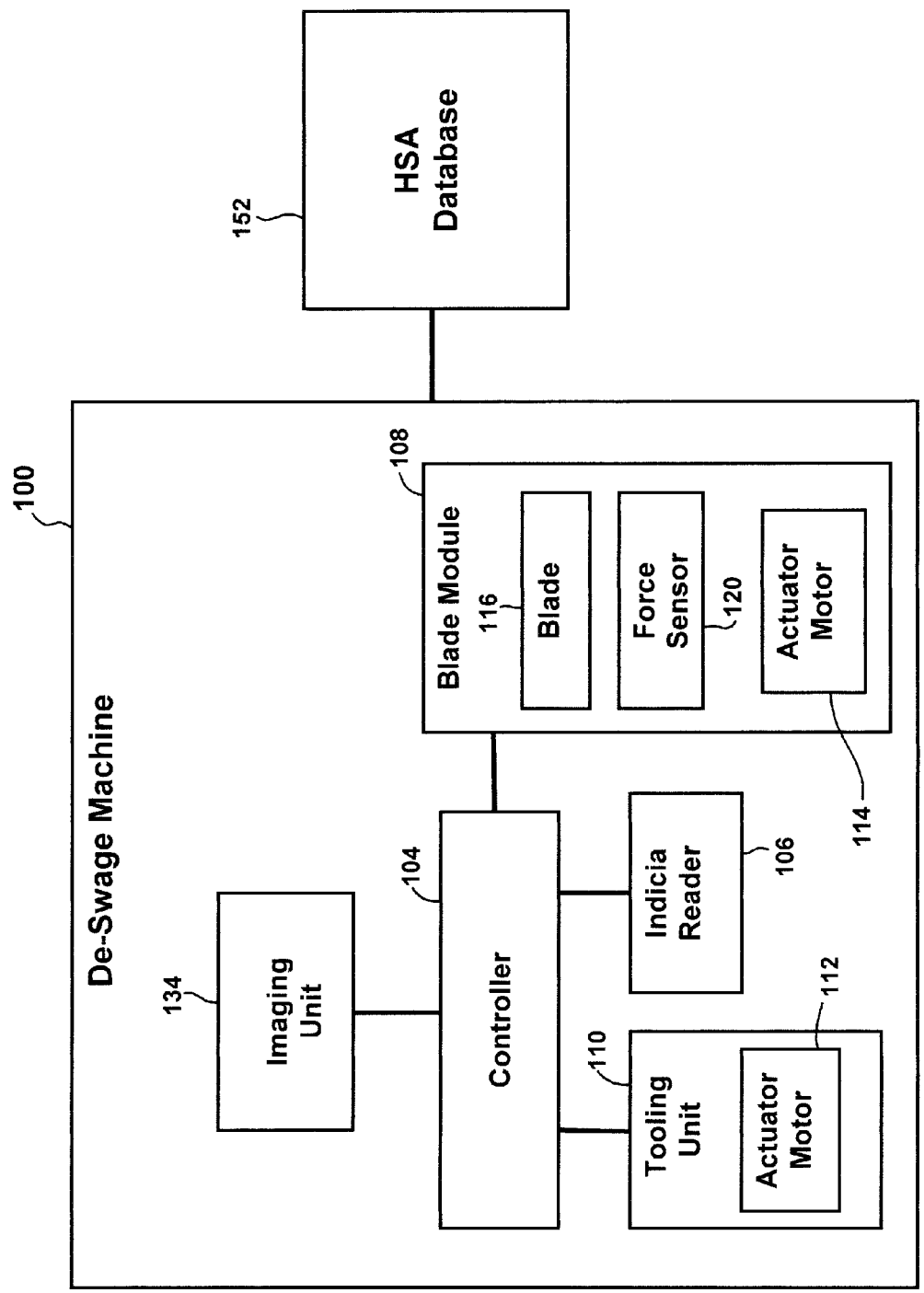
FIG. 8 is a box diagram of a de-swage machine and a head stack assembly database according to an embodiment.

In an embodiment, a box diagram of the de-swage machine 100 is shown in FIG. 8. As can be seen in the embodiment shown in FIG. 8, the de-swage machine 100 can also access a head stack assembly database 152. In an embodiment, the controller 104 accesses the head stack assembly database. The head stack assembly database 152 can store, for example, head stack assembly information, assigned position information of the blade 116, assigned position information of the selected head for removal, a predetermined force threshold, or any combination thereof.

In an embodiment, the head stack assembly information indicates which head 136 of the head stack assembly 118 should be removed. The head stack assembly information can, for example, correspond to the indicia 146 such that when the indicia 146 is read by the indicia reader 106, the head stack assembly information will indicate which head 136 of the head stack assembly 118 is selected for removal. In an embodiment, the assigned position information of the blade 116 indicates a predetermined expected location of the blade 116. In an embodiment, the assigned position information of the selected head for removal indicates a predetermined expected location of the selected head for removal.

Figure 9:
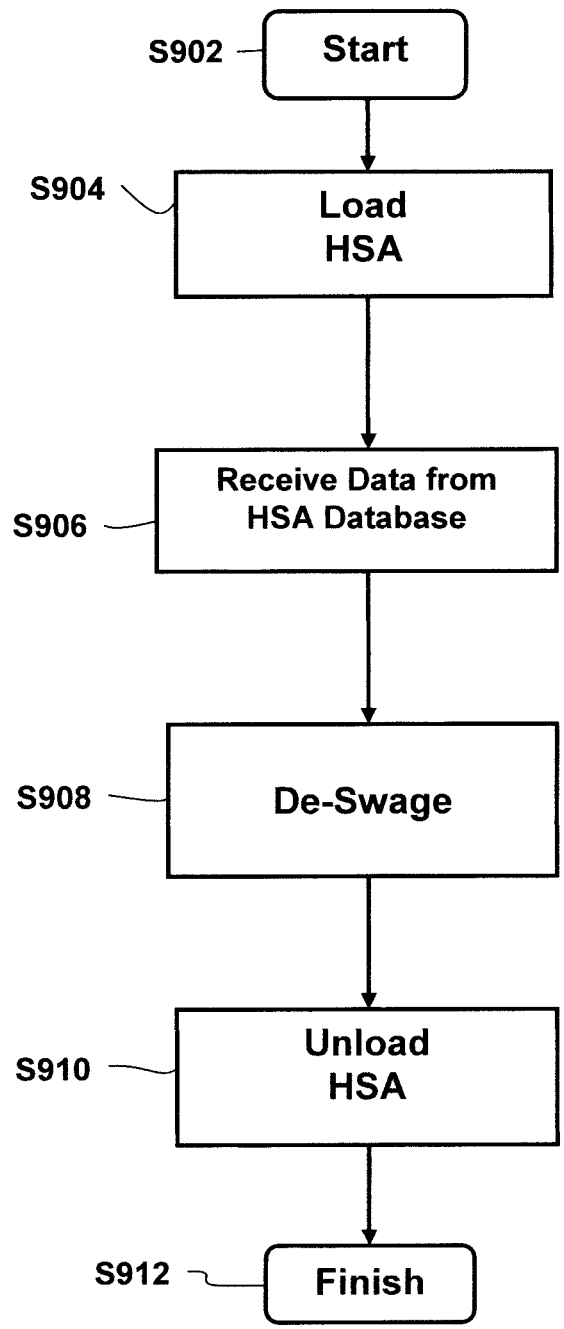
FIG. 9 depicts a process for removing a head from a head stack assembly according to an embodiment.

In an embodiment, the removal of the head of the head stack assembly is shown as a process in FIG. 9. In block S902, the process starts. In block S904, the head stack assembly 118 is loaded onto the de-swage machine 100. For example, the head stack assembly 118 is placed on and secured onto the body 130 of the tooling unit 110 as seen in the embodiments shown in FIGS. 4 and 5. Furthermore, the indicia holder 144 is secured to the body 130 so that the indicia 146 can be accessed by the indicia reader 106.

In block S906, the controller 104 receives data from the head stack assembly database 152. For example, the controller 104 can control the indicia reader 106 to read the indicia 146. The controller 104 can transmit the indicia 146 to the head stack assembly database 152. Furthermore, the controller 104 can receive head stack assembly information corresponding to the indicia 146 from the head stack assembly database 152. The head stack assembly information can indicate, for example, the selected head for removal.

In block S908, a de-swage process is utilized to remove the selected head. In an embodiment, the controller 104 removes the selected head using the blade module 108. For example, the controller 104 can align the selected head for removal with the blade 116 using the actuator motors 112 and 114. Furthermore, the controller 104 can control the actuator motor 114 to move the blade 116 towards the head stack assembly 118 to remove the selected head.

In block S910, the head stack assembly 118 is unloaded from the de-swage machine 100. For example, the head stack assembly 118 may be removed from the body 130 of the tooling unit 110.

Figure 10:
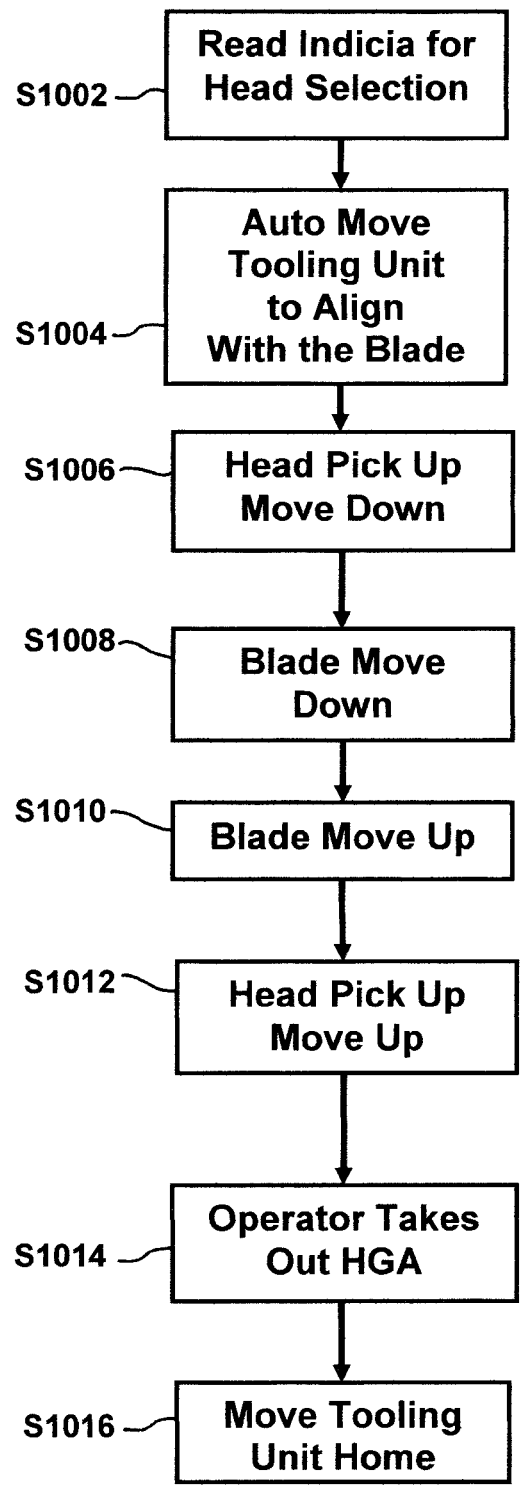
FIG. 10 depicts a process for removing a head from a head stack assembly according to an embodiment.

Furthermore, in an embodiment, additional details of blocks S906 and S908 are shown in FIG. 10. In block S1002, the controller 104 controls the indicia reader 106 to read the indicia reader 106 for selection of the head 136 for removal. In block S1004, the body 130 of the tooling unit 110 is moved to align with the blade 116. For example, the controller 104 can control the imaging unit 134 to generate position information of the blade 116 and position information of the selected head. The controller 104 then aligns the selected head with the blade 116 by using the actuator motor 112 to move the body 130 (which includes the selected head and the head stack assembly 118) and using the actuator motor 114 to move the blade module 108 (which includes the blade 116). In an embodiment, the controller 104 moves the selected head based on position information of the selected head and moves the blade 116 based on the position information of the blade 116.

Figure 11:
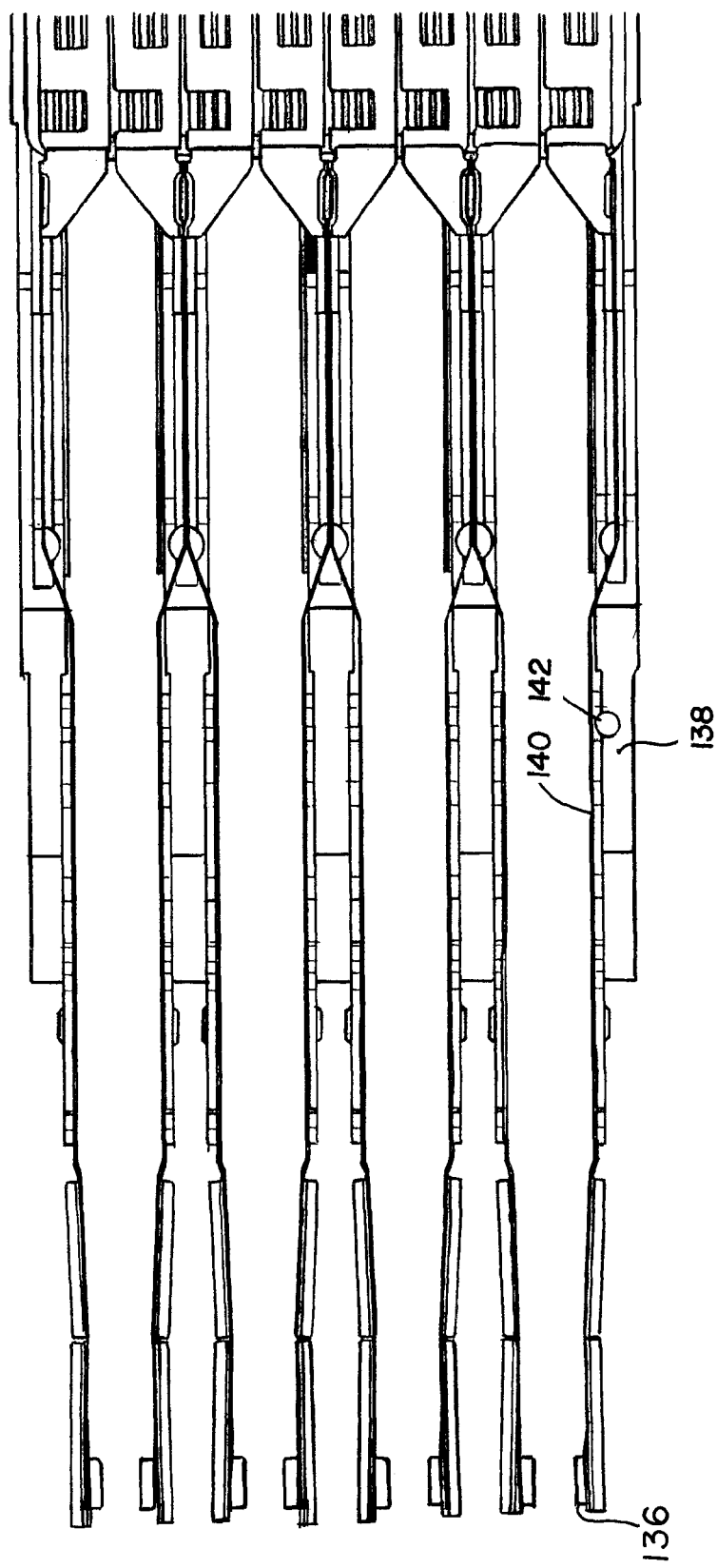
FIG. 11 depicts a portion of a head stack assembly according to an embodiment.

In an embodiment, the controller 104 moves the selected head using the actuator motor 112 and moves the blade 116 using the actuator motor 114 until the selected head and the blade 116 are aligned. In an embodiment, the alignment of the selected head and the blade 116 need not mean that the selected head is directly in the path of the blade 116. Instead, the alignment indicates that the head is aligned with the blade 116 such that the blade 116 can remove the head. For example, in an embodiment shown in FIG. 11, a location 142 of the blade tip 154 is between an arm 138 and a base plate 140 of the head stack assembly 118. This is because the blade 116 will separate the base plate 140 from the arm 138 in order to remove the selected head from the head stack assembly 118.

In an embodiment, the base plate 140 is coupled to the selected head for removal and the arm 138 is coupled to the base plate 140. In an embodiment, the base plate 140 need not be directly touching or be attached to the selected head. In an embodiment, additional components may be located between the base plate 140 and the selected head while still maintaining a mechanical relationship between the base plate 140 and the selected head such that the base plate 140 and the selected head are still coupled. In an embodiment, a head gimbal assembly comprising the selected head is removed from the head stack assembly 118.

Optionally, in block S1006, the controller 104 moves an optional head pick up unit used to pick up the selected head downwards in anticipation of picking up the selected head after the selected head has been removed by the blade 116. In an embodiment, the optional head pick up unit picks up the head gimbal assembly which includes the selected head.

Figure 12:
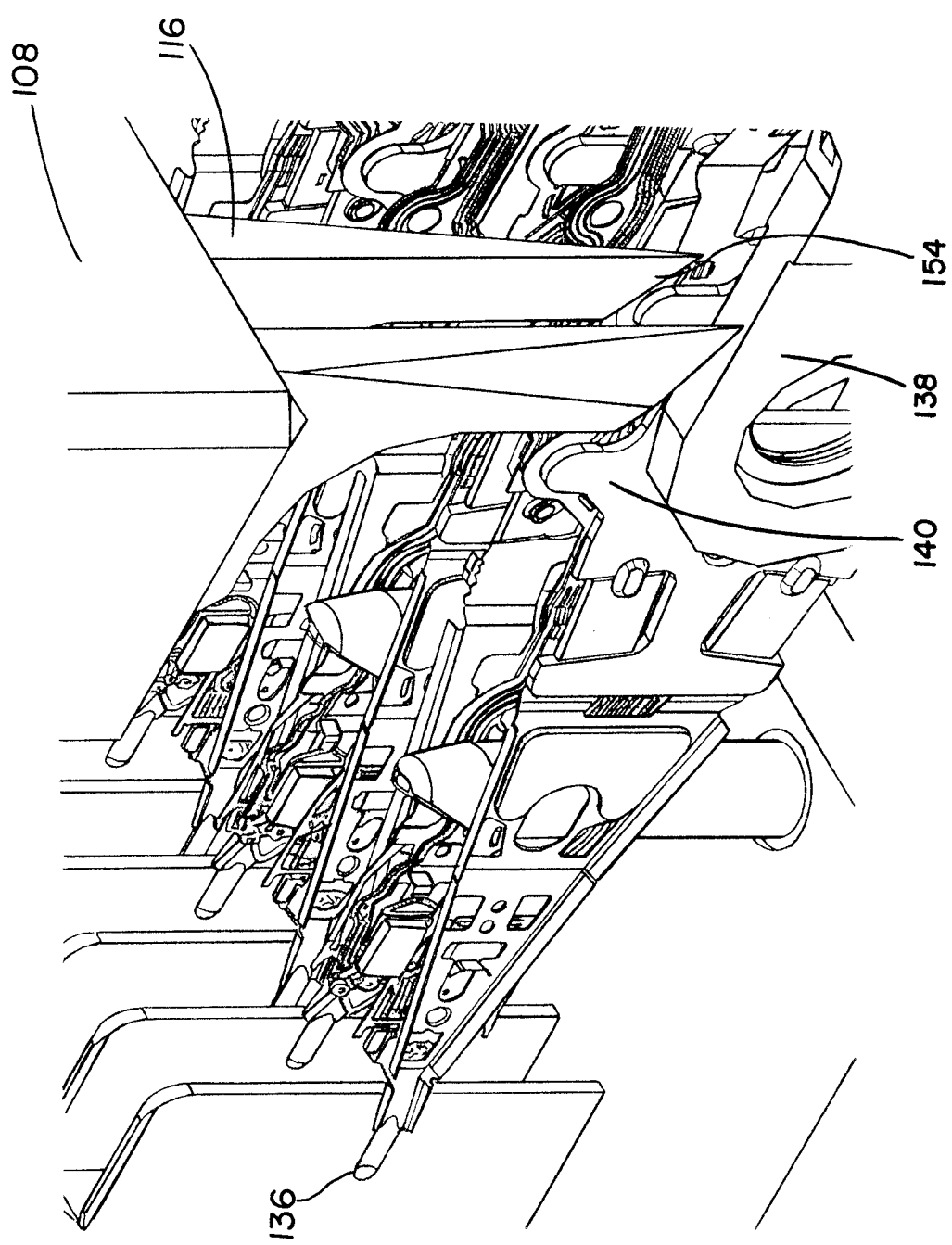
FIG. 12 depicts a portion of a de-swage machine and a head stack assembly according to an embodiment.
Figure 13:
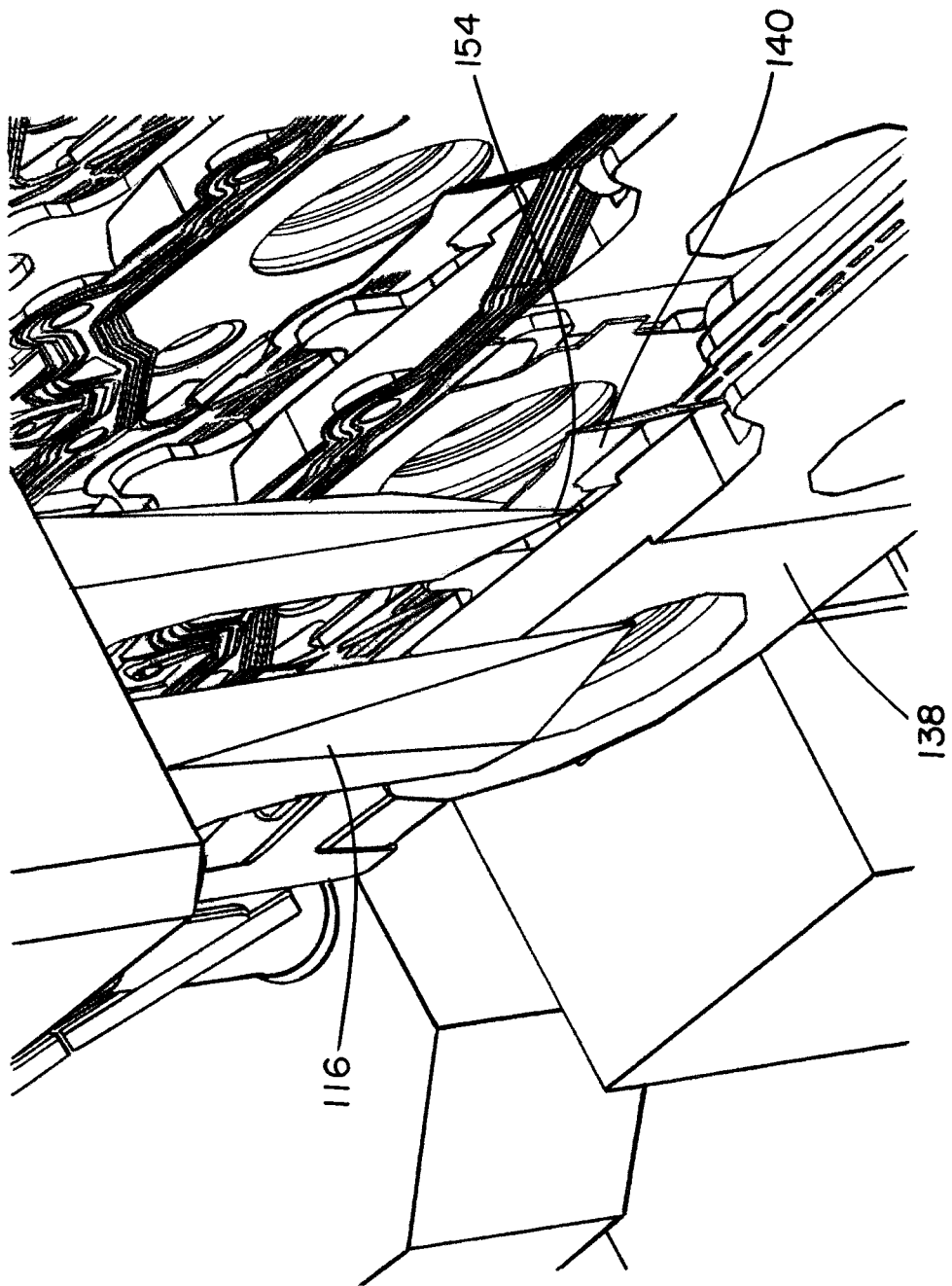
FIG. 13 depicts a portion of a de-swage machine and a head stack assembly according to an embodiment.

In block S1008, the controller 104 moves the blade 116 downwards towards the selected head to remove the selected head as shown in embodiment in FIGS. 12 and 13. In an embodiment, FIGS. 12 and 13 are a close-up view of the blade 116, the base plate 140, and the arm 138. As shown in the embodiments in FIGS. 12 and 13, the blade 116 separates the base plate 140 from the arm 138 in order to separate the head gimbal assembly including the selected head from the head stack assembly 118. In an embodiment, the blade 116 moves along the Z-axis as shown in the axis guide 158 in FIG. 1. In block S1010, the controller 104 moves the blade 116 upwards and away from the selected head.

Optionally, in block S1012, the controller 104 moves the optional head pick up unit upwards after the optional head pick up unit picks up the selected head removed by the blade 116. In an embodiment, the head gimbal assembly including the selected head, which is now removed from the head stack assembly 118, is picked up by the optional head pick up unit.

In block S1014, an operator takes out the head gimbal assembly including the selected head. If the optional head pick up unit was used, the operator can remove the head gimbal assembly from the head pick up unit. In block S1016, the controller 104 moves the tooling unit 110 to a home position for removal of the head stack assembly 118 from the body 130.

Figure 14:
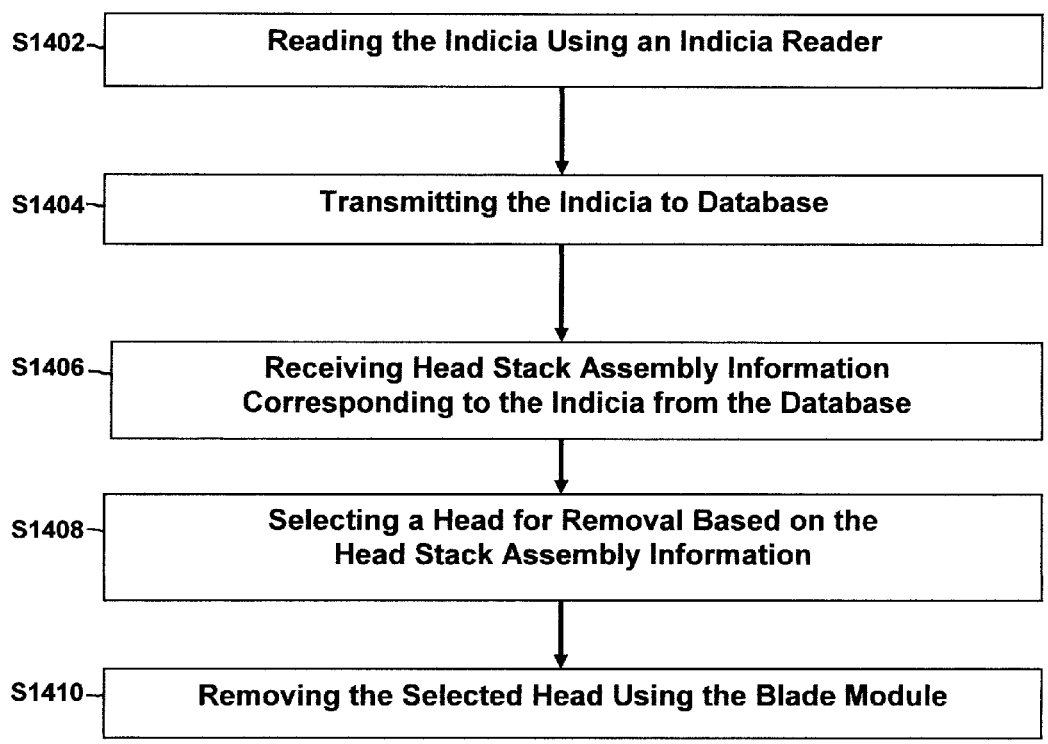
FIG. 14 depicts a process for selecting and removing a head from a head stack assembly using a de-swage machine according to an embodiment.

In an embodiment, a process for selecting and removing a head from the head stack assembly 118 using the de-swage machine 100 is shown in FIG. 14. In block S1402, the controller 104 controls the indicia reader 106 (FIGS. 6 and 7) to read the indicia 146 (FIG. 4). In block S1404 the controller 104 transmits the indicia 146 to the head stack assembly database 152 (FIG. 8). In block S1406, the controller 104 receives head stack assembly information corresponding to the indicia 146 from the head stack assembly database 152 (FIG. 8). In block S1408, the controller 104 selects the head from the head stack assembly 118 for removal based on the head stack assembly information.

In block S1410 the controller 104 controls the blade module 108 to remove the selected head. For example, the controller 104 controls the blade module 108 to move the blade 116 towards the head stack assembly 118 using the actuator motor 114. In an embodiment shown in FIG. 11 the blade tip 154 will contact the head stack assembly 118 at a location 142 to separate the head gimbal assembly including the selected head from the head stack assembly 118. As shown in the embodiments in FIGS. 12 and 13, the blade 116 will separate the head gimbal assembly including the selected head from the head stack assembly 118 by separating the base plate 140 from the arm 138.

Figure 15:
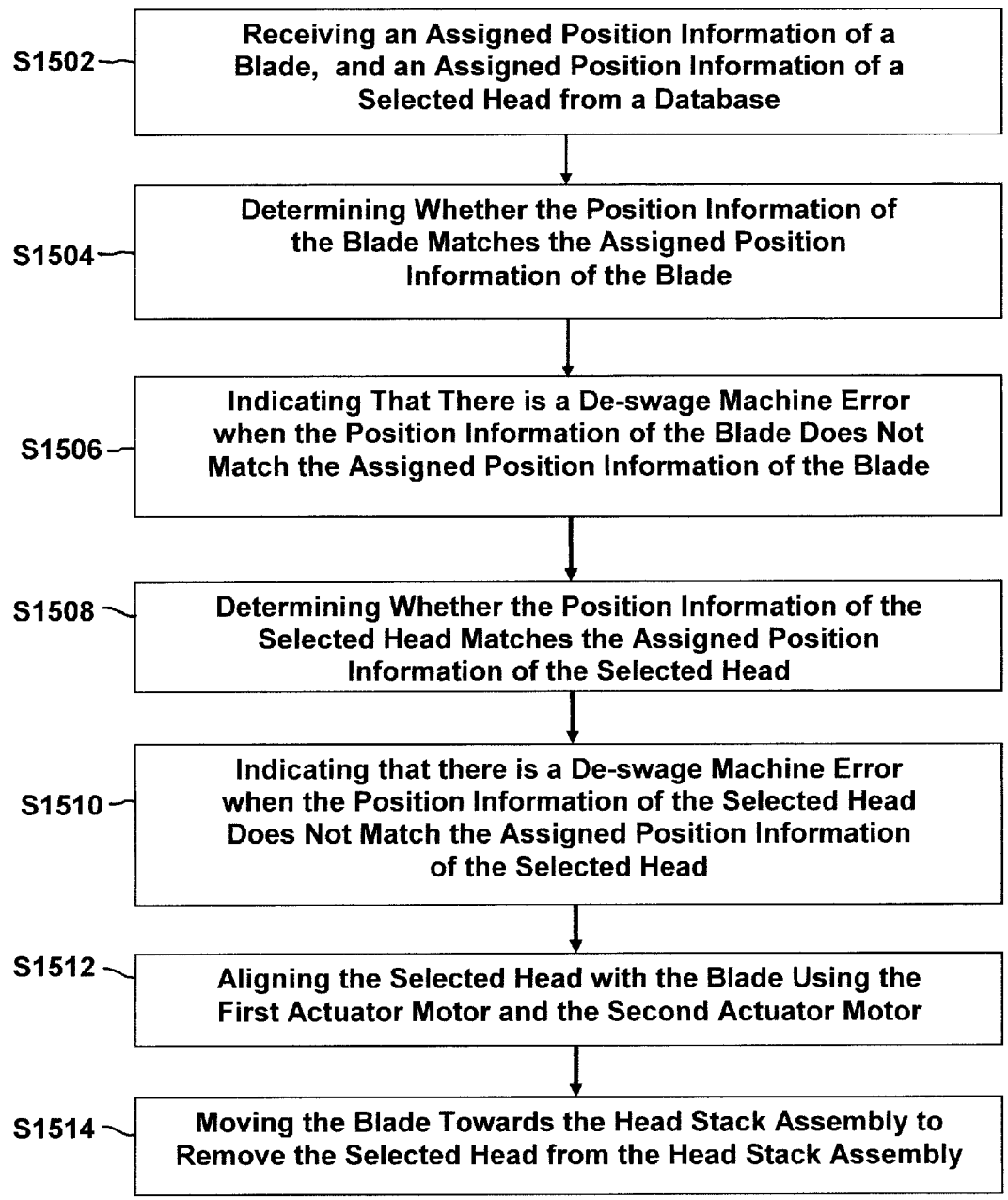
FIG. 15 depicts a process for performing auto gage verification of a de-swage machine and removing a selected head from the head stack assembly using the de-swage machine according to an embodiment.

In an embodiment, a process for performing auto gage verification of the de-swage machine 100 and removing a selected head from the head stack assembly 118 using the de-swage machine 100 is shown in FIG. 15. In block S1502, the controller 104 receives the assigned position information of the blade 116 and an assigned position information of the selected head for removal from the head stack assembly database 152 (FIG. 8). In block S1504, the controller 104 determines whether the position information of the blade 116 matches the assigned position information of the blade 116. In an embodiment, the controller 104 controls the imaging unit 134 (FIGS. 6 and 7) to generate the position information of the blade 116 for comparison with the assigned position information of the blade 116. In block S1506, the controller 104 indicates that there is a de-swage machine error when the position information of the blade 116 does not match the assigned position information of the blade 116. In an embodiment, when there is a de-swage machine error, the de-swage machine can be taken offline for service and/or recalibration.

In block S1508 the controller 104 determines whether the position information of the selected head for removal matches the assigned position information of the selected head for removal. In an embodiment, the controller 104 controls the imaging unit 134 (FIGS. 6 and 7) to generate the position information of the selected head for comparison with the assigned position information of the selected head. In block S1510, the controller 104 indicates that there is a de-swage machine error when the position information of the selected head does not match the assigned position information of the selected head. As previously noted, in an embodiment, when there is a de-swage machine error, the de-swage machine can be taken offline for service and/or recalibration.

Figure 3:
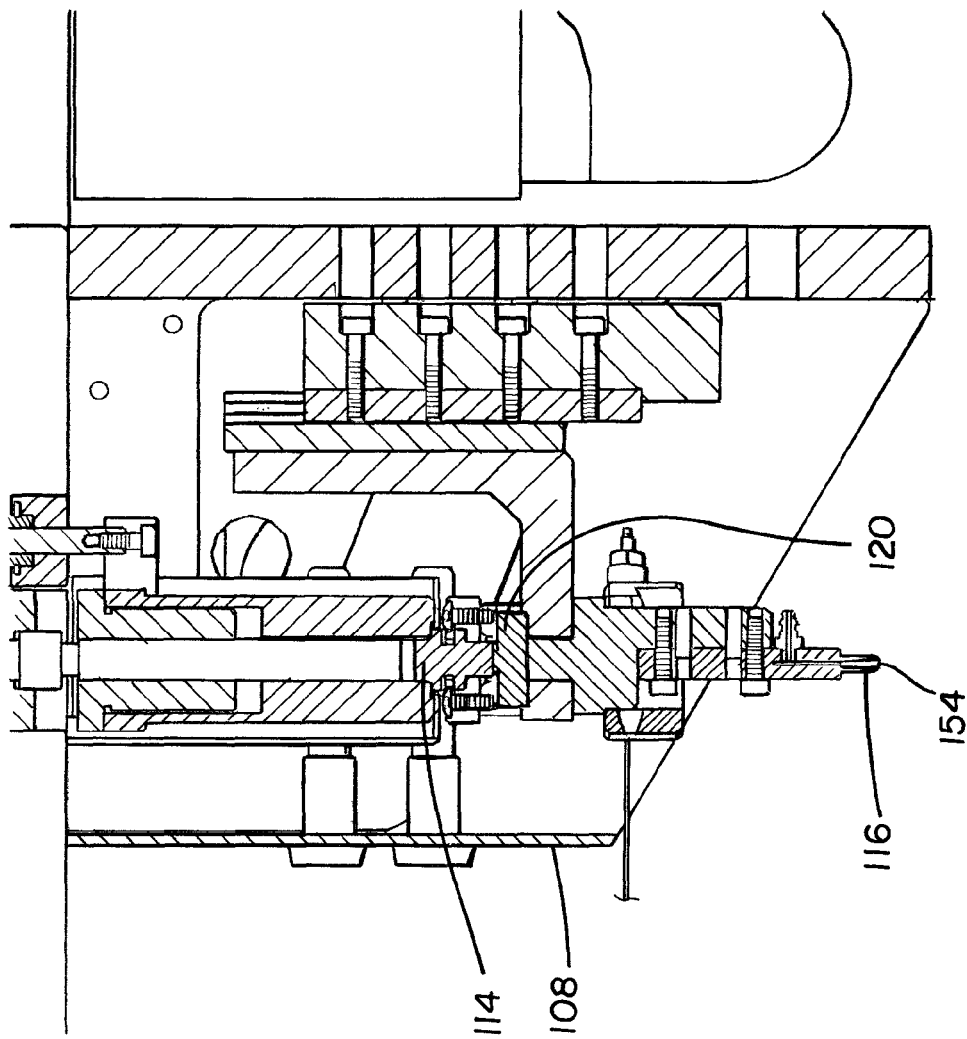
FIG. 3 depicts a partial side view of a de-swage machine according to an embodiment.

In block S1512, the controller 104 aligns the selected head with the blade 116 using the actuator motor 112 (FIG. 1) and the actuator motor 114 (FIG. 3). For example, the controller 104 can control the actuator motor 112 to move the body 130 of the tooling unit 110. The body 130 contains the head stack assembly 118 including the selected head for removal. The controller 104 can also control the actuator motor 114 to move the blade 116 so that the blade 116 is aligned with the selected head for removal. As previously noted, the alignment can be such that the blade 116 is in position to separate the base plate 140 from the arm 138 to thereby remove the selected head from the head stack assembly 118.

In block S1514, the controller 104 moves the blade 116 towards the selected head to remove the selected head from the head stack assembly 118. For example, the controller 104 can control the actuator motor 114 to move the blade 116 towards the selected head to remove the selected head from the head stack assembly 118. In an embodiment, the controller 104 removes the head gimbal assembly including the selected head from the head stack assembly 118 by separating the base plate 140 from the arm 138.

Figure 16:
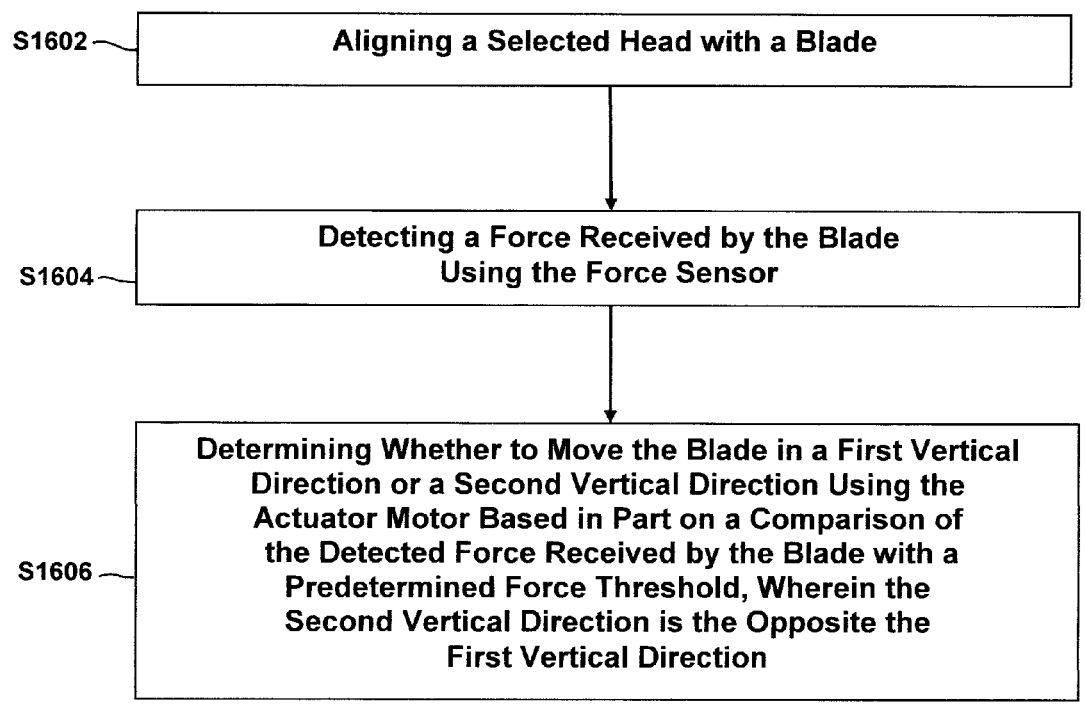
FIG. 16 depicts a process for removing a selected head from a head stack assembly using a de-swage machine according to an embodiment.

In an embodiment, a process for removing a selected head from the head stack assembly using the de-swage machine 100 is shown in FIG. 16. In block S1602, the controller 104 aligns the selected head with the blade 116. In block S1604, the controller 104 detects the force received by the blade 116 using the force sensor 120 (FIG. 3). In block S1606, the controller 104 determines whether to move the blade 116 in a first vertical direction or a second vertical direction using the actuator motor 114 based in part on a comparison of the detected force received by the blade with a predetermined force threshold. The second vertical direction can be, for example, opposite the first vertical direction. In an embodiment, the first vertical direction is towards the head stack assembly 118, while the second vertical direction is away from the head stack assembly 118.

In an embodiment, the predetermined force threshold corresponds to a force that indicates that the blade 116 has contacted the base plate 140 (FIG. 12) of the head stack assembly 118. In an embodiment, the head is removed from the head stack assembly 118 by separating the base plate 140 from the arm 138. In such a case, the blade 116 should slice between the base plate 140 and the arm 138. However, should the blade 116 contact the base plate 140 while the blade 116 tries to slice between the base plate 140 and the arm 138, the base plate 140 or the blade 116 may be undesirably damaged. Thus, the blade 116 should be moved in the second vertical direction, such as upwards and away from the head stack assembly 118.

In an embodiment, the predetermined force threshold corresponds to a force that indicates that the selected head has been removed. In an embodiment, this can indicate that the base plate 140 and the arm 138 have been separated and that the selected head has been removed. Thus, no additional chopping is required by the blade 116. Therefore, the blade 116 may be moved in the second vertical direction, such as upwards and away from the head stack assembly 118.

In an embodiment, the controller 104 moves the blade in the first vertical direction or the second vertical direction based in part on the comparison of the detected force received by the blade 116 and the predetermined force threshold.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A de-swage machine for removal of a head of a head stack assembly comprising:
    a tooling unit configured to receive a head stack assembly comprising a plurality of heads and an indicia;
    a blade module configured to remove a head from the head stack assembly;
    an indicia reader configured to read the indicia; and
    a controller configured to select and remove a head from the head stack assembly by at least:
        reading the indicia using the indicia reader;
        transmitting the indicia to a database;
        receiving head stack assembly information corresponding to the indicia from the database;
        selecting the head for removal based on the head stack assembly information; and
        removing the selected head using the blade module.

2. The de-swage machine of claim 1 wherein the indicia uniquely identifies the head stack assembly.

3. The de-swage machine of claim 1 wherein the head stack assembly information comprises information regarding which head of the head stack assembly is designated to be removed.

4. The de-swage machine of claim 1 wherein the indicia is a barcode, and the indicia reader is a barcode scanner.

5. The de-swage machine of claim 1 wherein the indicia is a serial number.

6. A method for selecting and removing a head from a head stack assembly using a de-swage machine comprising a tooling unit configured to receive a head stack assembly comprising a plurality of heads and an indicia, a blade module configured to remove a head from the head stack assembly, an indicia reader configured to read the indicia, and a controller, the method comprising:
    reading the indicia using the indicia reader;
    transmitting the indicia to a database;
    receiving head stack assembly information corresponding to the indicia from the database;
    selecting the head for removal based on the head stack assembly information; and
    removing the selected head using the blade module.

7. The method of claim 6 wherein the indicia uniquely identifies the head stack assembly.

8. The method of claim 6 wherein the head stack assembly information comprises information regarding which head of the head stack assembly is designated to be removed.

* * * * *